United States Patent [19]

Bloom et al.

[11] 4,011,133

[45] Mar. 8, 1977

[54] AUSTENITIC STAINLESS STEEL ALLOYS HAVING IMPROVED RESISTANCE TO FAST NEUTRON-INDUCED SWELLING

[75] Inventors: Everett E. Bloom; James O. Stiegler; Arthur F. Rowcliffe, all of Oak Ridge; James M. Leitnaker, Kingston, all of Tenn.

[73] Assignee: The United States of America as represented by the United States Energy Research and Development Administration, Washington, D.C.

[22] Filed: July 16, 1975

[21] Appl. No.: 596,546

[52] U.S. Cl. .............................. 176/68; 176/91 R; 75/128 C; 75/128 T
[51] Int. Cl.² .......................................... G21C 3/02
[58] Field of Search .......... 176/68, 91 R; 75/128 C, 75/128 T

[56] References Cited

UNITED STATES PATENTS

| | | | |
|---|---|---|---|
| 3,022,240 | 2/1962 | Bassett | 176/68 |
| 3,031,392 | 4/1962 | Ida et al. | 176/91 R X |
| 3,440,037 | 4/1969 | Martin et al. | 176/91 R |
| 3,563,728 | 2/1971 | Allio et al. | 176/91 R X |
| 3,658,516 | 4/1972 | Hachisu et al. | 75/128 T X |
| 3,663,366 | 5/1972 | Savar | 176/68 |
| 3,751,244 | 8/1973 | Mimino et al. | 75/128 T X |

*Primary Examiner*—Peter A. Nelson
*Attorney, Agent, or Firm*—Dean E. Carlson; David S. Zachry; Irving Barrack

[57] ABSTRACT

The present invention is based on the discovery that radiation-induced voids which occur during fast neutron irradiation can be controlled by small but effective additions of titanium and silicon. The void-suppressing effect of these metals in combination is demonstrated and particularly apparent in austenitic stainless steels.

5 Claims, 3 Drawing Figures

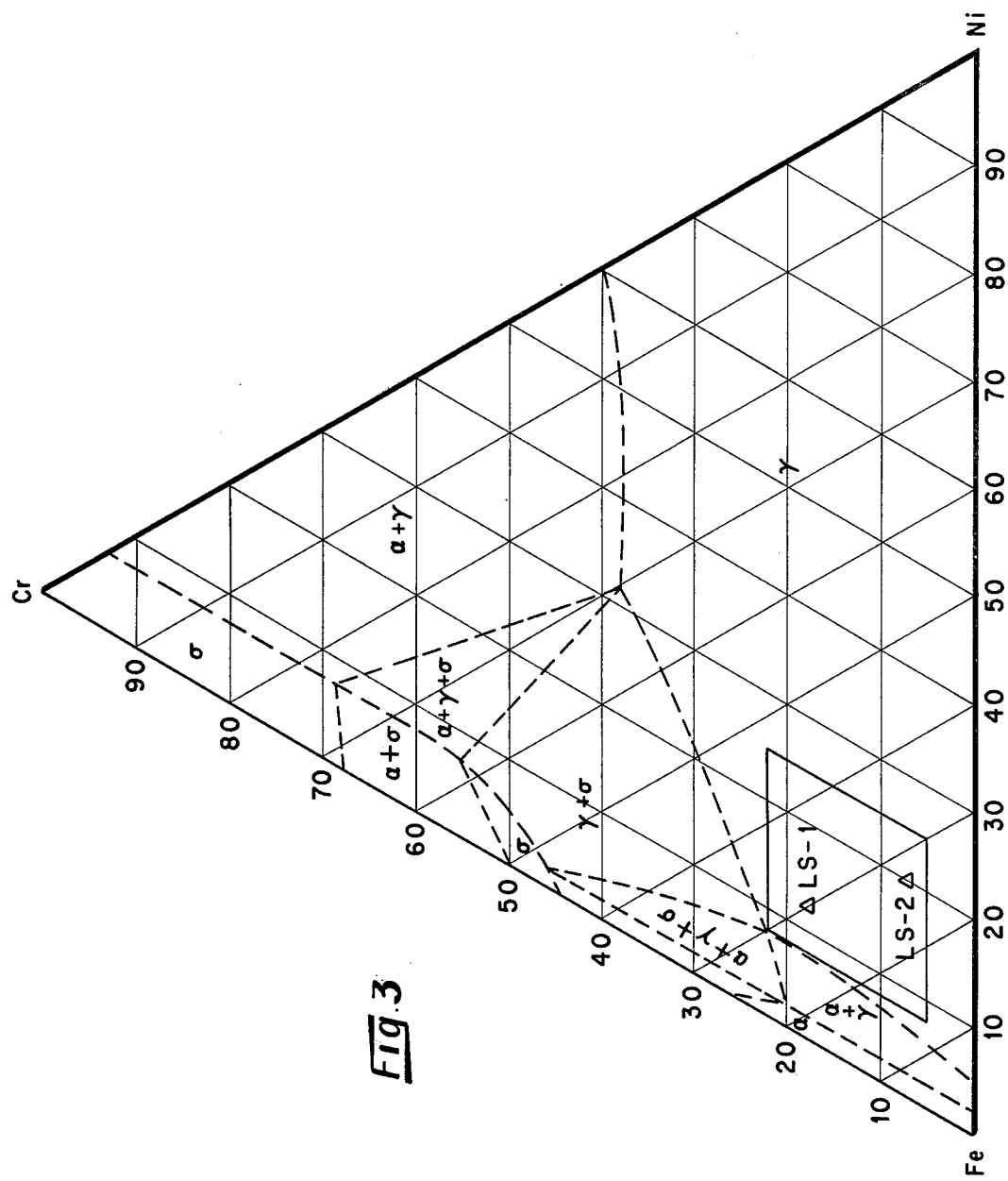

AUSTENITIC STAINLESS STEEL ALLOYS HAVING IMPROVED RESISTANCE TO FAST NEUTRON-INDUCED SWELLING

BACKGROUND OF THE INVENTION

The present invention relates to stainless steel alloys modified to withstand radiation damage attributable to fast neutrons. In a method sense, the invention to be described provides an alloy design formula wherein existing alloys may be modified or new alloys may be synthesized which exhibit enhanced resistance to density and dimensional changes resulting from exposure to fast neutrons at high temperature, i.e., greater than about 300° C. In still another sense, the invention resides in stainless steel clad nuclear fuel elements intended for use in fast neutron environments wherein the stainless steel cladding is an austenitic stainless steel containing void suppressing concentrations of Si and Ti and the nuclear fuel is an oxide such as $UO_2$, a nitride such as UN or $U_2N_3$, a carbide of uranium (such as UC or $UC_2$) or mixed with an oxide, nitride, or carbide of Pu or Th.

The core components of a thermal or fast nuclear reactor are known to undergo a variety of stresses during their service life. For example, the fuel cladding will experience thermal and mechanical stress due to such factors as fission gas pressure, fuel-cladding interactions, and differential thermal swelling due to development of thermal gradients in the core. Nuclear transmutations, particularly $(n,\alpha)$ reactions, play an important role in radiation behavior of alloys, such as stainless steels. Experience with stainless steel has shown that the combination of thermal and irradiation effects lead to hardening and embrittlement of fuel core materials and supporting structural elements.

As materials research extended to the study of irradiation effects in fast breeder reactors, a new radiation phenomenon was discovered. In 1967, Cawthorne and Fulton of Dounreay Experimental Reactor Establishment, UKEA, reported that stainless steel fuel cladding exposed to neutrons developed extensive internal porosity in the form of small cavities or voids. The British finding stimulated activity in the field of irradiation damage as reported in "Radiation-Induced Voids in Metals" dated April 1972, a publication of U.S. Atomic Energy Commission, Office of Information Services.

Irradiation-induced swelling results from precipitation of vacancies into voids and interstitials into dislocation loops. Creation of the vacancies and interstitials is the result of collision between a neutron and a lattice atom. In such a collision, a portion of the neutron energy is imparted to a lattice atom sufficient to tear away from its lattice site. The result of this collision is the production of vacant sites and the atoms rejected from their former positions end up in interstitial sites. The dominant features of void swelling can be described as a phenomenon characterized in that it occurs in a fast neutron environment at elevated temperatures in the range 350°–600° C. Swelling increases approximately linearly with fluence after a threshold dose is exceeded. The swelling does not appear to saturate. As voids form, density decreases, and hence volume increases. In stainless steels the amount of swelling varies with temperature, with most swelling occuring between 400°–600° C. Operating temperatures of LMFBR cladding and structural components are 350° to about 700° C. and thus encompass the temperature of maximum swelling of 300 series stainless steels. Reactor design engineers who have studied the economical implications involved with the phenomenon of radiation-induced swelling have estimated that cost savings of the order of billions of dollars could be realized if void swelling could be reduced only a few percent in the 300 series stainless steel alloys contemplated for use as fuel cladding in fast breeder reactors under design or contemplated for construction.

SUMMARY OF THE INVENTION

It is, accordingly, a general object of this invention to provide a process or alloy design formula for suppressing the formation of voids induced in metals and alloys as a result of interaction with fast neutrons at elevated temperatures.

A principal object of this invention is to provide a low-swelling alloy which can be used as a cladding in a nuclear fuel for a fast breeder reactor or as a supporting structure for the core.

A specific object of this invention is to provide a low-swelling austenitic stainless steel.

Another object of this invention is to provide a formula or method whereby minor modifications in alloy composition lead to a major reduction in void swelling due to fast neutrons.

Another specific object of this invention is to provide a type 316 stainless steel that exhibits very low swelling in comparison to previously known type 316 steels.

Still another object of this invention is to provide a solid solution stainless steel alloy suitable for use as a cladding for a fast breeder reactor fuel.

A further object of this invention is to provide nuclear fuel elements having a stainless steel cladding which contains void suppressing quantities of Si and Ti.

BRIEF DESCRIPTION OF THE DRAWINGS

These and other objects of the invention will become apparent from the ensuing description taken in conjunction with the drawings in which.

DETAILED DESCRIPTION

The inventive concept of this invention is based on the discovery that effective concentrations of silicon, titanium, and zirconium in certain stainless steel alloy formulations within prescribed silicon and titanium concentration limits of both elements result in an alloy having improved resistance to swelling due to voids induced by fast neutrons. The void suppressive effect provided by additions of silicon and titanium may be termed synergistic since the improvements in void formation observed after using silicon and titanium together within prescribed concentrations are greater than any void suppressive effect noted by the use of one in the absence of the other.

We have found that small amounts of titanium and silicon have a profound effect in suppressing the void formation in austenitic stainless steels which results from prolonged exposure of such steels to a fast neutron flux at elevated temperatures. Because the effective amounts of silicon and titanium necessary to achieve void suppression is small, the inventive concept permits formulation of alloys whose otherwise desirable physical and mechanical properties are not thereby adversely affected. In general, the benefits of this invention are achieved by additions of silicon in the range 0.70 to 2% and titanium additions in the range 0.10 to 0.5% will result in significant void suppression.

The exact amount of Si and Ti may vary from one austenitic composition to another and will represent a compromise between maximum achievable void suppression and minimal adverse metallurgical effects of Ti and Si or interaction of these additives with other alloy components. Thus, in 304 and 316 stainless steel, maximum void suppression and maximum strength are achieved at a Ti concentration in the range of 0.2 to 0.46% and a Si concentration which should not exceed 2%. While further void suppression may be expected at higher Ti and Si concentrations, other adverse metallurgical factors come into play. Further additions of Ti lead to a reduction in strength while further increases in Si lead to the formation of low-melting Si-containing entities.

Figure 3:
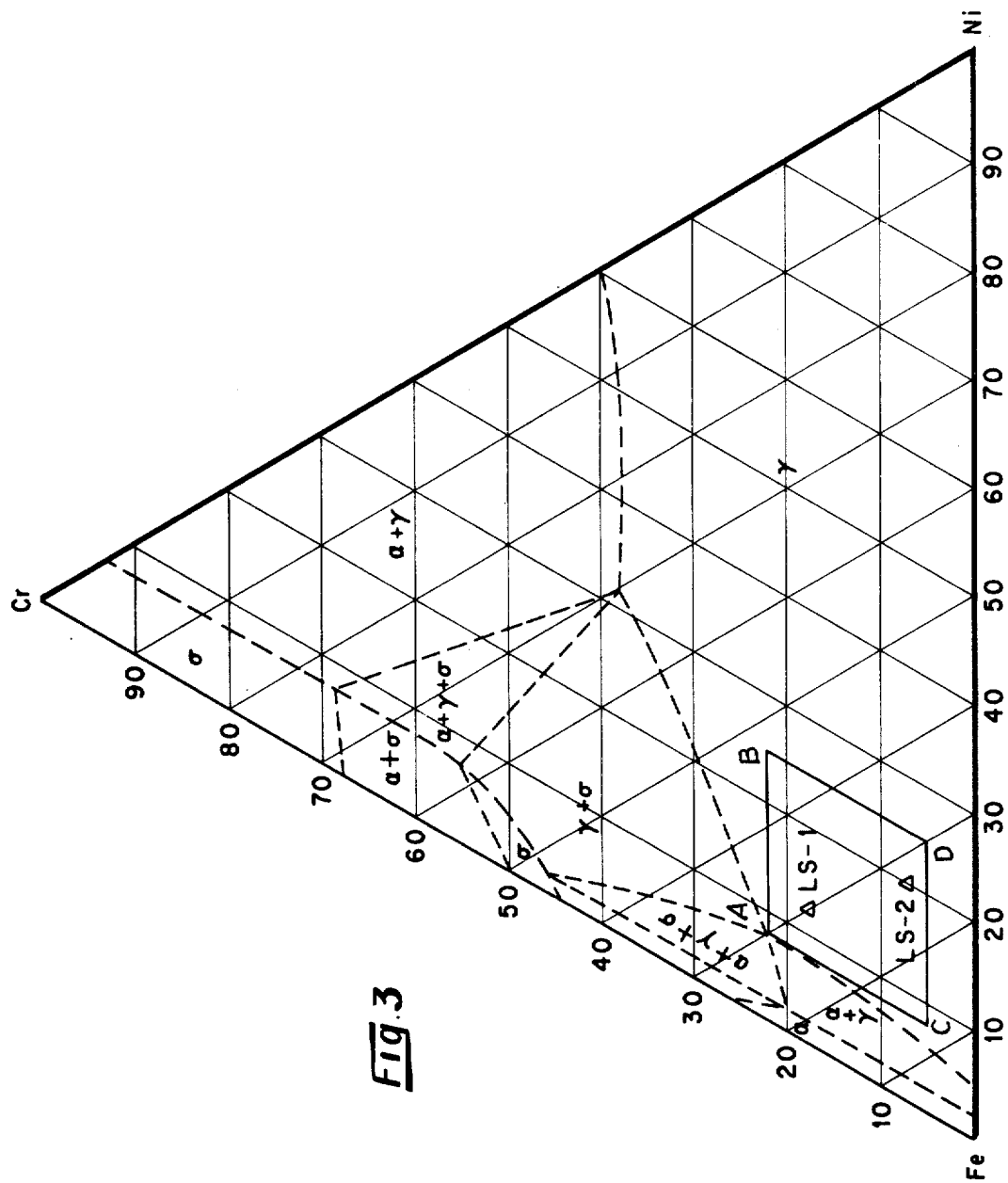
FIG. 3 is a ternary diagram of the Fe-Cr-Ni system upon which is outlined an area ABCD of austenitic stainless steels which may be modified with Si and Ti to obtain low-swelling stainless steels in accordance with this invention.

The void suppression behavior of Si and Ti is most pronounced in the austenitic stainless steels encompassed within the quadrilateral area ABCD of the ternary Fe-Cr-Ni system shown in FIG. 3. To achieve maximum void suppression while maintaining austenitic stability, the Cr concentration should not exceed 22% nor should the minimum Ni content fall below 8%. Stainless (oxidation resistance) quality and strength dictate that minimum Cr concentration should not fall below 5%. It has been found that swelling decreases with increasing Ni content (greater than about 30% Ni) in Fe-Cr-Ni austenitic alloys.

The extent to which Si and Ti additions decrease voids in such high (greater than 30%) nickel alloys may be academic since high Ni alloys suffer from several disadvantages for LMFBR application. The high Ni alloys are susceptible to corrosion by liquid sodium, are highly susceptible to fission product attack, and (compared to the alloys within ABCD of FIG. 3) result in reduced neutron economy.

The void suppression effect will be illustrated in the following representative examples in which the advantages in the herein-disclosed inventive concept are utilized, as a best mode, to convert a type 316 stainless steel and other stainless steels known to exhibit very large swelling into a low-swelling alloy by minor modifications in titanium and silicon. In each case, the modified alloy was prepared and the swelling behavior tested in accordance with the following procedure.

Approximately two pounds of each alloy tested were prepared by melting high purity alloy constituents under an inert gas atmosphere. The alloys were cast into ½-inch bar and subsequently rolled into a sheet of the desired thickness. Small samples (about ⅛× ⅛× 0.060 inch thickness) were cut and mounted in a specimen holder which allows the simultaneous irradiation of several samples. In this way, a direct comparison of the behavior of several alloys was obtained. Specimen surfaces were prepared by mounting the specimens in the holder and simultaneously polishing all specimens with successively finer abrasives. Swelling is inferred from measurement of the step which occurs on the surface of the sample when a portion of the surface is shielded during ion irradiation by a 0.010 inch mask. The area under the mask is protected from the ion beam and does not swell while the unmasked area does. The size of the step on the specimen at the interface between the masked (unbombarded) and unmasked (bombarded) regions is a measure of the degree of swelling. Swelling or volume increase was estimated using an empirical correlation published by Johnston et al. in *J. Nuclear Material*, Vol. 54, pp. 24–40. A step height of 60 A corresponds to a swelling of 1% at the peak of the damage curve.

Because of the higher damage rate in an ion simulation experiment (vacancies and interstitials are produced about $10^3$ times faster in an ion irradiation than in a neutron irradiation), the temperature at which peak swelling occurs is shifted upwards about 100° C. Thus, irradiation at about 655° C. with ions corresponds to irradiation at about 555° C. with neutrons. Step heights were measured with a Dektak surface profilometer; a minimum of six measurements were made on each specimen. After step height measurement, the mask was moved to another region of the specimen for the next dose increment. Helium preinjection was carried out using a $Cm_2^{244}O_3$ source which emits a 5.8 MeV α-particle. The source geometry was arranged to give a flat helium profile over the first 4–5 μ of range.

EXAMPLE I

A series of experimental alloys were prepared in accordance with the above-described procedure. Swelling behavior of the experimental alloys LS1 and LS2 was measured and compared with commercially available austenitic types 316, TiM-316, Nimonic PE-616, and FV-548. The compositions of the experimental and several commercially available alloys are given in Table I. Heat treatments and resulting grain size for LS1, LS2 and the commercial alloys are shown in Table II.

TABLE I

| Alloy | Fe* | Cr | Ni | Mo | Mn | Si | Ti | Al | Nb | V | Co | Zr | W | Cu | C | N |
|---|---|---|---|---|---|---|---|---|---|---|---|---|---|---|---|---|
| P7 | | 17.0 | 16.7 | 2.5 | 0.03 | 0.10 | 0.01 | 0.02 | 0.02 | — | 0.03 | — | — | 0.02 | 0.001 | — |
| 316 | | 17.6 | 14.4 | 2.5 | 1.67 | 0.36 | 0.01 | 0.005 | — | 0.05 | 0.02 | 0.01 | — | — | 0.03 | 0.018 |
| TiM 316 | | 17.5 | 14.0 | 2.5 | 1.41 | 0.03 | 0.29 | 0.02 | — | 0.03 | 0.02 | — | — | — | 0.06 | 0.004 |
| FY 548 | | 16.7 | 11.5 | 1.4 | 1.08 | 0.45 | — | — | 0.73 | — | — | — | 0.10 | — | 0.08 | |
| P.E. 16 | | 16.7 | 43.8 | 3.38 | 0.13 | 0.26 | 1.03 | 1.10 | — | — | — | — | — | — | 0.06 | |
| A7 (LS1) | | 16.3 | 13.4 | 1.9 | 1.9 | 1.0 | 0.10 | — | 0.03 | 0.2 | 0.05 | 0.04 | 0.05 | 0.15 | 0.05 | 0.02 |
| B7 (LS2) | | 8.7 | 19.4 | 2.3 | 1.9 | 1.0 | 0.27 | — | 0.05 | 0.15 | 0.07 | 0.10 | 0.15 | 0.15 | 0.04 | |
| H7 | | 10.9 | 15.4 | 1.9 | 1.76 | 1.06 | 0.16 | — | — | — | — | 0.07 | — | — | 0.04 | 0.02 |
| K-7 | | 11.8 | 14.3 | 2.1 | 1.80 | 1.04 | 0.17 | — | — | — | — | — | 0.07 | — | 0.04 | 0.02 |
| L7 | | 11.8 | 15.1 | 2.0 | 1.84 | 1.08 | 0.17 | — | — | — | — | — | — | 0.08 | 0.04 | 0.02 |

TABLE I-continued

| Alloy | Fe* | Cr | Ni | Mo | Mn | Si | Ti | Al | Nb | V | Co | Zr | W | Cu | C | N |
|---|---|---|---|---|---|---|---|---|---|---|---|---|---|---|---|---|
| M7 | | 12.2 | 15.6 | 2.1 | 1.91 | 1.06 | 0.17 | — | — | 0.07 | — | — | — | — | 0.04 | 0.02 |
| N7 | | 11.8 | 14.4 | 2.0 | 1.86 | 1.02 | 0.17 | — | — | — | — | — | — | — | 0.04 | 0.02 |

*Balance Iron

TABLE II

| Alloy | Heat Treatments<br>Heat Treatment | Average Grain<br>Diameter μm |
|---|---|---|
| 316 Annealed | 1050° C 15 min. | 12 |
| C.W. 316 | 1050° C 15 min. + 20% Cold Work | 12 |
| Ti Modified 316 | 1050° C 15 min. | 15 |
| F.V. 548 | 1075° C 3 min. + 850° C 3 hr | — |
| PE 16 | 1050° C 4 hr, + 900 1 hr, + 750° C 8 hr | 25 |
| LS1 | 1050° C 1 hr | 45 |
| LS2 | 1050° C 1 hr | 45 |

Figure 1:
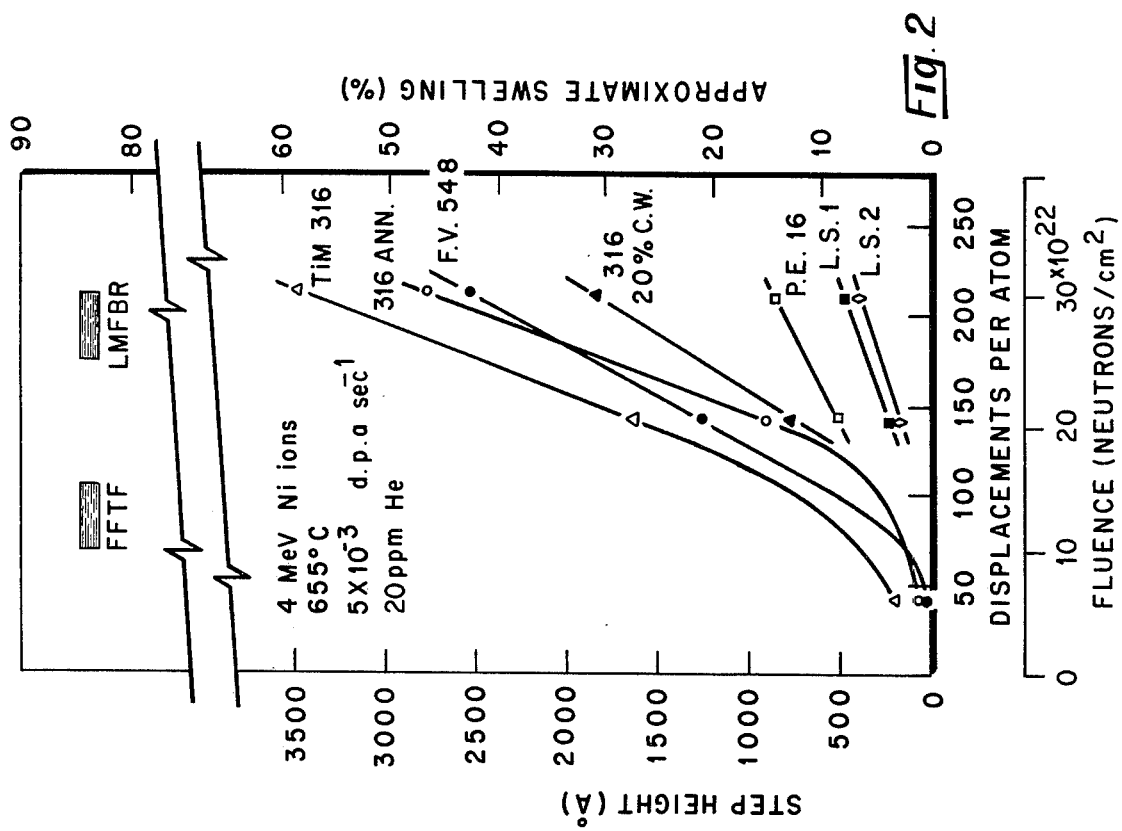
FIG. 1 is a graph showing the degree of swelling of an improved alloy of this invention as a function of the number of displacements per atom (dpa), which in turn can be related to the neutron fluence. These data were obtained by bombarding the alloys with nickel ions after injecting with helium to 10 atomic parts per million (PPM)
Figure 2:
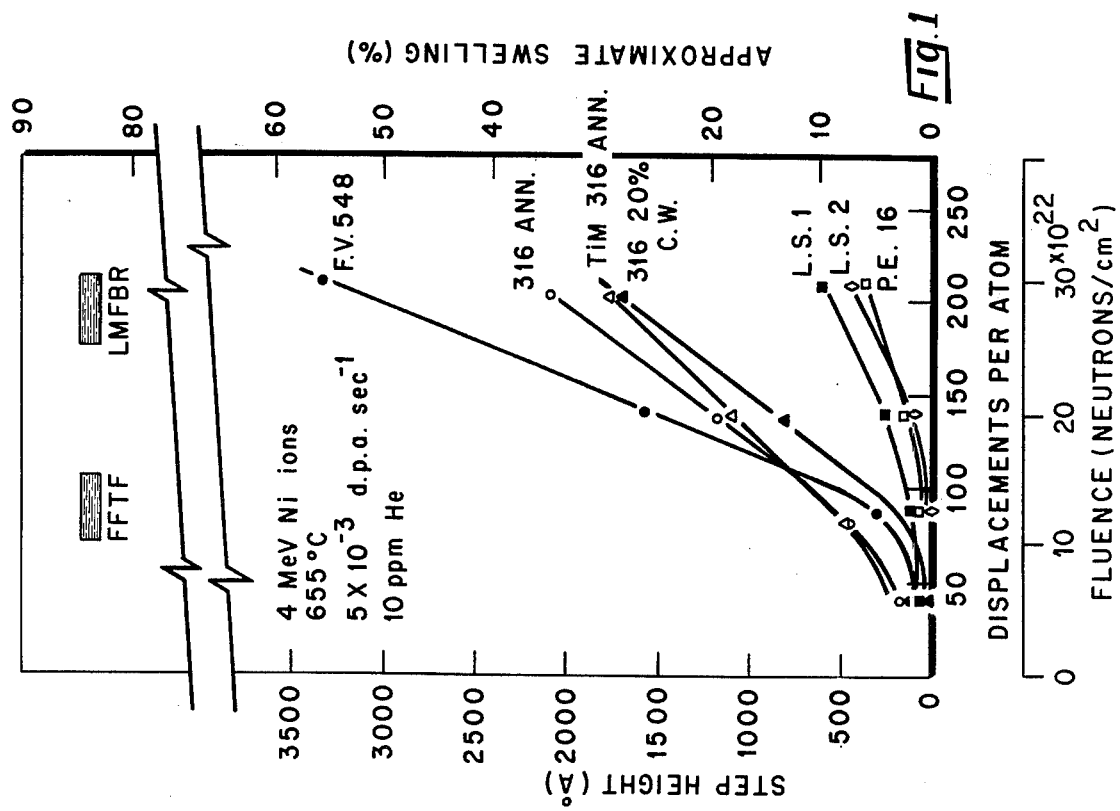
FIG. 2 displays results from a similar experiment except that the alloys were injected with 20 parts per million helium. Ion bombardment after injection of helium simulates the LMFBR neutron environment.

The results of swelling tests are displayed in FIG. 1 where the alloy specimens were injected to 10 parts per million helium and in FIG. 2 where the alloy specimens were injected to 20 parts per million helium. As shown in FIGS. 1 and 2, the alloys fall into two groups, a high-swelling group consisting of PE 16, a virtually silicon-free stainless steel FV548; annealed 316; 20% cold-worked 316; and a 0.29% titanium-modified 316, all commercially available alloys. The low-swelling group consisted of PE 16, a commercially available high (43.87%) nickel precipitation-hardened austenitic alloy and annealed LS1 and LS2 wherein LS1 corresponds to a type 316 steel modified to contain void suppressing concentrations of silicon and titanium. LS2 is a low-chromium stainless steel alloy in the iron-chromium-nickel region that normally exhibits very large swelling, with the silicon and titanium modifications to produce an alloy which shows a low degree of swelling comparable to the high nickel PE 16 alloy.

From FIG. 1 it is seen that LS1 and LS2 under expected LMFBR conditions, at a fluence of $30 \times 10^{22}$, swell less than 10% while TiM 316 swells about 30% and FV348 swells about 50%. The data displayed in FIG. 2 further enphasizes the remarkable differences between the LS1 and LS2 formulations and other austenitic alloys of similar composition. At an injection of 20 ppm He, the TiM 316 swelling has risen beyond FV548 and the PE 16 swelling has increased from about 5 to 15% while the LS1 and LS2 formulations remained fairly stable.

The synergistic void depressant quality of Si and Ti is seen from a comparison of type 316 stainless steel which contains 0.36 Si, but not an effective concentration of Ti and TiM 316 which contains Ti, but not an effective concentration of Si. Both alloys exhibit large swelling. This is to be compared with LS1 and LS2 which contain effective concentrations of both Si and Ti to produce, in each case, a low-swelling austenitic stainless steel.

Comparing the compositions of the low-swelling LS1 and LS2 alloys with the commercial 316 series stainless steels, it is seen that the silicon and titanium content in the commercial formulations was well below those prescribed by the present invention and exhibited very high void swelling. On the other hand, it is seen that by only slight variations in the minor constituents of the 316 iron-chromium-nickel composition to comply with the concentrations prescribed by the present invention as represented by the LS1 and LS2 formulations an alloy results having a markedly low swelling in iron-chromium-nickel regions that have previously been regarded as inherently high swelling and not subject to modification in swelling behavior by minor compositional variations.

EXAMPLE II

An additional way of identifying the role of silicon and titanium as well as other elements which may contribute to or suppress void swelling or LS1 and LS2 may be seen by reference to alloys H-7, K-7, L-7, M-7, and N-7 in Table I, all of which contain chromium and nickel concentrations between LS1 and LS2. In formulating these alloys they were modified to contain nominally 1% silicon and 0.2% titanium. In addition, certain of the melts were made up to contain small additions of 0.1% zirconium (H-7), tungsten (K-7), copper (L-7), and vanadium (M-7). These alloys were fabricated into strips, mounted in ion bombardment holder, together with specimens LS1 and LS2, and a high purity 316 alloy (P-7) containing 0.1% silicon and 0.01% titanium. The alloys were then polished, pre-injected with 10 parts per million helium, followed by bombardment with 4 MeV nickel ions at 655° C. and 705° C. to 140 and 210 displacements per atom (dpa). Step height measurements are shown in Table III.

TABLE III

| Alloy | Wt %<br>Si | Wt %<br>Ti | Wt %<br>Minor Element | Step Height, A | |
|---|---|---|---|---|---|
| | | | | 640° C | 705° C |
| P 7 | 0.10 | 0.01 | All <0.02 | 4550 | 6700 |
| H 7 | 1.06 | 0.16 | 0.07 Zr | 372 | <200 |
| K 7 | 1.07 | 0.17 | 0.07 W | 550 | <200 |
| L 7 | 1.08 | 0.17 | 0.08 Cu | 535 | <200 |
| M 7 | 1.06 | 0.17 | 0.07 V | 645 | <200 |
| N 7 | 1.02 | 0.17 | All <0.02 | 440 | <200 |
| LS1 | 0.93 | 0.11 | 0.15V, 0.05W, 0.15Cu, 0.05Zr | 350 | 250 |

TABLE III-continued

| Alloy | Wt % Si | Wt % Ti | Wt % Minor Element | Step Height, A 640° C | 705° C |
|---|---|---|---|---|---|
| LS2 | 1.10 | 0.27 | 0.15V, 0.15W, 0.15Cu, 0.10Zr | <200 | <200 |

As a guide to the amount of induced swelling, a step height of 60 A corresponds to about 1% of swelling. It is seen that void swelling as indicated by the step height measurment of the N-7 alloy was lower by more than an order of magnitude than the P-7 alloy which contains only trace amounts of silicon and titanium. Alloy N-7 which contains chromium and nickel concentrations midway between those of compositions LS1 and LS2 shows very little swelling when compared with annealed or cold-worked 316 stainless steel, see FIGS. 1 and 2. The addition of zirconium produced a slight reduction in swelling (H-7) whereas additions of copper (L-7), tungsten (K-7), or vanadium (M-7) all produced increases in swelling relative to N-7. These data show that according to the inventive concept, silicon and titanium levels present in LS1 and LS2 as well as in iron-chromium-nickel alloys having intermediate composition levels result in a decrease in swelling. Individual additions of tungsten, vanadium, or copper at the levels present in LS1 and LS2 do not appear to have a significant effect on swelling. On the other hand, minor zirconium additions appear to aid in void suppression. When present together and in sufficient quantities, silicon and titanium are an effective void suppressant combination as reflected by a resultant reduction in swelling.

In accordance with the herein-described inventive concept, we have shown that minor compositional modifications of a type 316 stainless steel (in the region of the iron-chromium-nickel system that has previous to this invention exhibited very large swelling) has been modified to exhibit swelling characteristics known only for the high nickel-containing alloys. By recognizing the role of minor additions of silicon and titanium in suppressing void formation in in-reactor material, engineers are now provided with options to select or formulate other low-swelling candidate alloys in low nickel-containing (less than 25%) region of the iron-chromium-nickel system which have desirable mechanical properties. Thus, in accordance with our invention, such low Ni-containing stainless steels as the type 304, 321, 318 series as well as other austenitic stainless steel alloys can now be modified to contain void depressing amounts of silicon and titanium to produce low-swelling alloys previously thought unattainable.

Typical make-up of commercial stainless steel compositions which may be modified with void depressing concentrations of Si and Ti are as follows:

Type 304 — 18–20 Cr, 8–11 Ni, up to 0.08 C, up to 2 Mn, and the balance Fe.
Type 316 — 16–18 Cr, 10–14 Ni, 2–3 Mo, 0.04–0.06C, 1.5–2 Mn, up to 0.75 Si, and the balance Fe.
Type 321 — 17–19 Cr, 8–11 Ni, up to 2 Mn, up to 0.08 C, minimum Ti = 5 × C, and the balance Fe.
12R72HV — 14.8 Cr, 15 Ni, 1.96 Mn,, 1.1 Mo, 0.48 Ti, 0.33 Si, and the balance Fe.

It should be understood that this invention contemplates minor modifications in Si and Ti in other austenitic stainless steels by adjustments of Si and Ti to void depressing concentrations to achieve reductions in swelling to a greater or lesser degree than that demonstrated for LS1 and LS2. Furthermore, to the extent that the composition of known austenitic steels contain void depressing concentrations of Si and Ti, the basic inventive concept herein disclosed extends to and contemplates a process for the selection of such alloys to fabricate clad nuclear fuels and to resultant compositions and articles as intended for use under fast neutron flux void-forming and hence swelling conditions.

And finally, while we have identified a formula for developing low-swelling alloys by specific minor compositional variations, it is within the scope of this invention to induce structural modifications which inhibit swelling to an even further extent. For example, such structural modifications as cold working, and/or grain refinement in combination with the herein-described compositional modifications should produce an alloy which inhibits void swelling to an even greater extent than that effected by the minor compositional variations.

As used herein "an austenitic stainless steel alloy" designated as "consisting essentially of" means an austenitic stainless steel containing Fe, Cr, Ni, up to 3% Mo, up to 2% Mn, up to 0.08% C, and a void depressing concentration of silicon and titanium. Any designated alloy may also contain unspecified incidental ingredients which we define as ingredients which may be introduced in or accompany the process of alloy manufacture in accordance with common steel-making processes, and do not materially affect the basic and novel characteristics of the claimed alloy. Such incidental impurities may include, as a maximum, 0.01 N, 0.05 Al, 0.03 As, 0.001 B, 0.05 Co, 0.05 Cb, 0.1 Cu, 0.02 P, 0.01 S and 0.2 V.

What is claimed is:

1. A nuclear fuel element comprising a core selected from the group consisting of an oxide nitride or carbide of uranium and an austenitic stainless steel alloy cladding consisting essentially of Fe, Cr, and Ni as prescribed within the area ABCD in the ternary diagram of FIG. 3, and a void depressing concentration of Si and Ti.

2. The fuel element of claim 1 in which the core comprises a mixture of an oxide, nitride, or carbide of uranium and an oxide, nitride, or carbide of a metal selected from the group consisting of plutonium or thorium.

3. The nuclear fuel element of claim 1 in which the austenitic stainless steel cladding consists essentially of, in weight percent, 8.7 to 16.2 percent chromium, 13.4 to 19.4 percent nickel, 1.9 to 2.3 percent molybdenum, a void suppressing concentration of silicon and titanium and the balance iron.

4. The nuclear fuel element of claim 3 in which the silicon concentration in the cladding is in the range 0.7 to 2 percent and the titanium concentration is in the range 0.1 to 0.5 percent.

5. In a method for cladding a reactor fuel comprising an oxide, nitride, or carbide of uranium, the improvement which comprises cladding said fuel with an austenitic stainless steel consisting essentially of Fe, Cr, and Ni as prescribed within the area ABCD in the ternary diagram of FIG. 3, a void depressing concentration of Si and Ti, and incidental alloy ingredients.

* * * * *

UNITED STATES PATENT OFFICE
CERTIFICATE OF CORRECTION

Patent No. 4,011,133    Dated  March 8, 1977

Inventor(s)  Everett E. Bloom et al.

It is certified that error appears in the above-identified patent and that said Letters Patent are hereby corrected as shown below:

On the cover sheet the Illustrative Figure and FIG.3, should appear as shown on the attached sheet.

Signed and Sealed this

Seventh Day of February 1978

[SEAL]

Attest:

RUTH C. MASON
*Attesting Officer*

LUTRELLE F. PARKER
*Acting Commissioner of Patents and Trademarks*